(12) United States Patent
Miao

(10) Patent No.: US 11,750,689 B2
(45) Date of Patent: Sep. 5, 2023

(54) SPEECH PROCESSING METHOD AND APPARATUS, DEVICE, STORAGE MEDIUM AND PROGRAM

(71) Applicant: Apollo Intelligent Connectivity (Beijing) Technology Co., Ltd., Beijing (CN)

(72) Inventor: Shiqian Miao, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 17/818,727

(22) Filed: Aug. 10, 2022

(65) Prior Publication Data

US 2022/0385724 A1 Dec. 1, 2022

(30) Foreign Application Priority Data

Aug. 10, 2021 (CN) .......................... 202110913861.9

(51) Int. Cl.
*H04L 67/10* (2022.01)
*G10L 25/93* (2013.01)

(52) U.S. Cl.
CPC .............. *H04L 67/10* (2013.01); *G10L 25/93* (2013.01)

(58) Field of Classification Search
CPC ................................ H04L 67/10; G10L 25/93
USPC ......................................................... 709/201
See application file for complete search history.

(56) References Cited

U.S. PATENT DOCUMENTS

| 10,176,809 | B1* | 1/2019 | Piérard | .................... G10L 15/18 |
| 11,176,934 | B1* | 11/2021 | Venkatesh Raman | ....................... G10L 15/32 |
| 2013/0251118 | A1* | 9/2013 | Waalkes | ................ H04M 3/527 379/88.01 |
| 2015/0194148 | A1 | 7/2015 | Wong et al. | |
| 2016/0148610 | A1 | 5/2016 | Kennewick, Jr. et al. | |
| 2019/0066676 | A1* | 2/2019 | Ogawa | .................... G10L 15/30 |
| 2020/0326832 | A1* | 10/2020 | Lee | ........................... G06F 3/16 |

(Continued)

FOREIGN PATENT DOCUMENTS

| CN | 111968631 A | 11/2020 |
| CN | 112489644 A | 3/2021 |
| KR | 10-2011-0009614 A | 1/2011 |

OTHER PUBLICATIONS

European Search Report of corresponding European Application No. 22189665.7, dated Jan. 16, 2023, 5 pages.

*Primary Examiner* — Wing F Chan
*Assistant Examiner* — Leon Y Tseng
(74) *Attorney, Agent, or Firm* — Tucker Ellis LLP

(57) ABSTRACT

The present disclosure provides a speech processing method. A specific implementation solution is: a terminal device sends at least one speech intention to a server in a process of receiving first speech information, where each speech intention is a speech intention corresponding to a part of speech information in the first speech information; the server acquires response information corresponding to the at least one speech intention; the terminal device sends the first speech information to the server in response to completion of receiving the first speech information; the server acquires a second speech intention corresponding to the first speech information, and sends the response information corresponding to the first speech intention to the terminal device, and the terminal device outputs the response information.

20 Claims, 9 Drawing Sheets

(56) References Cited

U.S. PATENT DOCUMENTS

2022/0399013 A1* 12/2022 Zhang .................... G06F 40/30

* cited by examiner

SPEECH PROCESSING METHOD AND APPARATUS, DEVICE, STORAGE MEDIUM AND PROGRAM

CROSS-REFERENCE TO RELATED APPLICATIONS

This application claims priority to Chinese Patent Application No. 202110913861.9, filed on Aug. 10, 2021, which is hereby incorporated by reference in its entirety.

TECHNICAL FIELD

The present disclosure relates to the fields of speech technologies and natural language processing technologies in artificial intelligence, and in particular, to a speech processing method and apparatus, a device, a storage medium and a program.

BACKGROUND

With the rapid development of artificial intelligence technologies, more and more terminal devices support speech interaction function. In a process of speech interaction process, a user inputs speech information to the terminal device, and the terminal device outputs response information corresponding to the speech information to the user.

In related technologies, a processing process of speech information in the speech interaction scene is as follows: after receiving complete speech information, a terminal device sends the complete speech information to a server. The server performs intention recognition on the complete speech information to obtain the user's intention, acquires corresponding response information according to the user's intention, and sends response information to the terminal device. Further, the terminal device outputs the response information to the user.

However, in the above related technologies, the speech interaction delay is high.

SUMMARY

The present disclosure provides a speech processing method and apparatus, a device, a storage medium and a program.

According to a first aspect of the present disclosure, a speech processing method is provided, including:
sending at least one speech intention to a server in a process of receiving first speech information, where each speech intention is a speech intention corresponding to a part of speech information in the first speech information;
sending the first speech information to the server in response to completion of receiving the first speech information;
receiving response information corresponding to a first speech intention from the server, where the response information is determined by the server after receiving the first speech intention, the first speech intention is the same as a second speech intention corresponding to the first speech information, and the at least one speech intention includes the first speech intention; and
outputting the response information.

According to a second aspect of the present disclosure, a speech processing method is provided, including:
receiving at least one speech intention sent by a terminal device in a process of receiving first speech information, and acquiring response information corresponding to the at least one speech intention, where each speech intention is a speech intention corresponding to a part of speech information in the first speech information;
receiving the first speech information sent by the terminal device and acquiring a second speech intention corresponding to the first speech information; and
sending response information corresponding to the first speech intention to the terminal device, where the first speech intention is a same speech intention as the second speech intention in the at least one speech intention.

According to a third aspect of the present disclosure, an electronic device is provided, including:
at least one processor; and
a memory communicatively connected with the at least one processor; where,
the memory is stored with instructions executable by the at least one processor, and the instructions are executed by the at least one processor to enable the at least one processor to execute the method according to any one of the first aspects or the method according to any one of the second aspects.

It should be understood that the contents described in this part are not intended to identify key or important features of the embodiments of the present disclosure, nor are they intended to limit the scope of the present disclosure. Other features of the present disclosure will be easily understood by the following description.

BRIEF DESCRIPTION OF DRAWINGS

The accompanying drawings are used to better understand solutions, but do not limit the present disclosure. In the accompanying drawings.

DESCRIPTION OF EMBODIMENTS

The following describes exemplary embodiments of the present disclosure in combination with the accompanying drawings, in which various details of the embodiments of the present disclosure are included to facilitate understanding, and they shall be considered as merely exemplary. Therefore, those skilled in the art should realize that various changes and modifications can be made to the embodiments described herein without departing from the scope and spirit of the present disclosure. Similarly, for the sake of clarity and conciseness, the description of well-known functions and structures is omitted in the following.

The present disclosure provides a speech processing method and apparatus, a device, a storage medium and a program, which are applied to the fields of speech technologies and natural language processing technologies in artificial intelligence, so as to reduce speech interaction delay.

Figure 1:
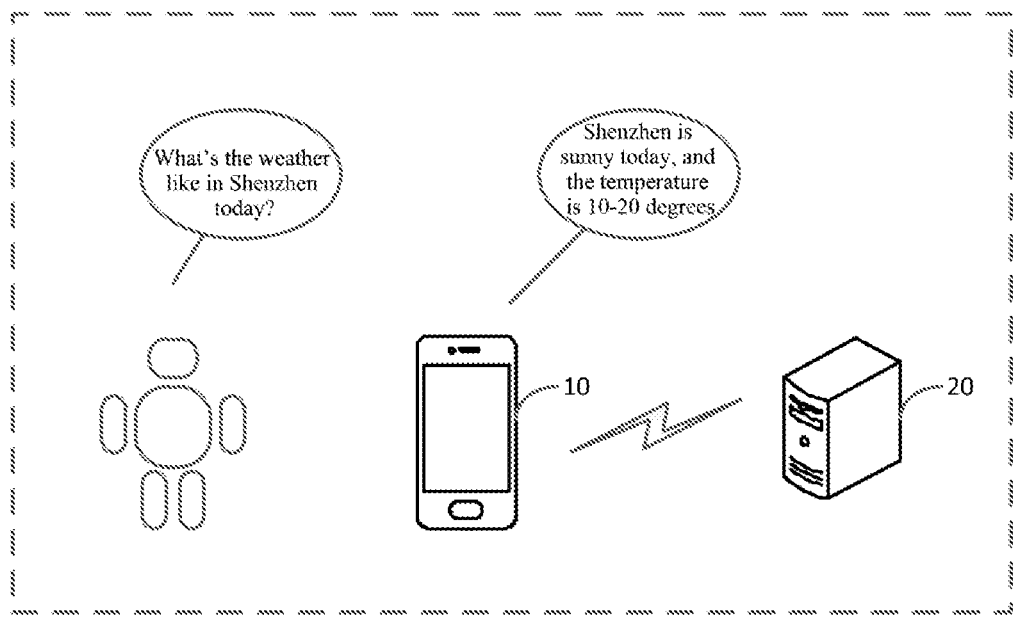
FIG. 1 is a schematic diagram of a speech interaction scene.

Embodiments of the present disclosure are applicable to speech interaction scenes. FIG. 1 is a schematic diagram of a speech interaction scene. As shown in FIG. 1, the scene includes a terminal device 10 and a server 20. The terminal device 10 and the server 20 are connected through a network. The terminal device 10 is provided with a speech interaction function. A user inputs speech information to the terminal device 10. After receiving the speech information, the terminal device 10 acquires response information corresponding to the speech information through interaction with the server 20. Furthermore, the terminal device 10 outputs response information to the user.

For example, referring to FIG. 1, the user inputs a speech message "what's the weather like in Shenzhen today" to the terminal device 10. The terminal device 10 outputs a response message "Shenzhen is sunny today, and the temperature is 10-20 degrees" to the user.

In this embodiment, the terminal device 10 can be any electronic device supporting speech interaction function, including but not limited to: a smart speaker, a smart phone, an in-vehicle speech device, smart furniture, a smart wearable device, etc. The server 20 may be a server providing a semantic parsing function. The server can be a cloud server, also known as a cloud computing server or a cloud host. It is a host product in a cloud computing service system, which solves shortcomings of traditional physical host and VPS services ("Virtual Private Server", or "VPS" for short) such as difficult management and weak business scalability. The server can also be a distributed system server or a server combined with blockchain.

In related technologies, a processing process of speech information in the speech interaction scene is as follows: after receiving complete speech information, a terminal device sends the complete speech information to a server. The complete speech information refers to a complete sentence expressed by a user, such as: "what's the weather like in Shenzhen today (shen zhen jin tian de tian qi zen me yang)", or, "is it going to rain in Shenzhen today (shen zhen jin tian hui bu hui xia yu)", etc. The server performs intention recognition on the complete speech information to acquire the user's intention, obtains corresponding response information according to the user's intention, and sends response information to the terminal device. Further, the terminal device outputs the response information to the user.

Figure 2:
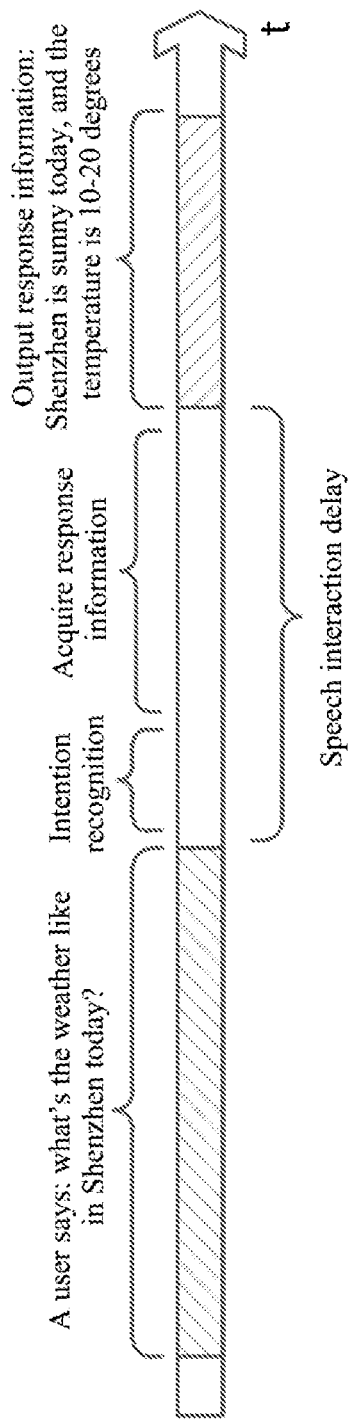
FIG. 2 is a schematic diagram of a speech interaction delay in related technologies.

However, in the process of realizing the present disclosure, the inventor found that in the above related technologies, a speech interaction delay is relatively high. In the embodiment of the present disclosure, the speech interaction delay refers to: a time period from when the user speaks the speech information to when the user receives the response information. FIG. 2 is a schematic diagram of a speech interaction delay in the related technologies. After the user says "what's the weather like in Shenzhen today (shen zhen jin tian de tian qi zen me yang)", it takes a while to hear "Shenzhen is sunny today, and the temperature is 10-20 degrees", and the time period is the speech interaction delay.

Referring to FIG. 2, in the above related technologies, after receiving complete speech information, a terminal device sends the complete speech information to a server. The server performs intention recognition on the complete speech information to acquire the user's intention, acquires corresponding response information according to the user's intention, and sends response information to the terminal device. The inventor analyzes time consumption of each processing stage in the above process and finds that it takes a long time for the server to acquire the corresponding response information. The reason is that when the server acquires the corresponding response information according to the user's intention, it usually needs to interact with a third-party resource server. For example, when the user's intention is to "query the weather in Shenzhen today", the server needs to send a query request to a weather server, and receive queried weather information from the weather server (the weather information is response information corresponding to the user's intention). In this way, the time period required for the server to acquire the corresponding response information according to the user's intention depends on a network communication delay between the server and the third-party resource server on the one hand, and the time period required for the third-party resource server to acquire the response information on the other hand.

In order to solve the problem of relatively high speech interaction delay in the above related technologies, the inventor of the present disclosure creatively proposes the following inventive concept on the basis of the above analysis: in a process of receiving speech information input by the user, the user's intention is predicted in advance, and corresponding response information is acquired in advance based on the user's intention. In this way, after receiving complete speech information, if the user intention predicted in advance is accurate, the response information can be directly output. In this way, by predicting the user's intention in advance and acquiring the response information corresponding to a predicted intention in advance, the speech interaction delay is reduced.

The technical solution of the present disclosure is described in detail below with specific embodiments. The following specific embodiments can be combined with each other, and the same or similar concepts or processes may not be repeated in some embodiments.

Figure 3:
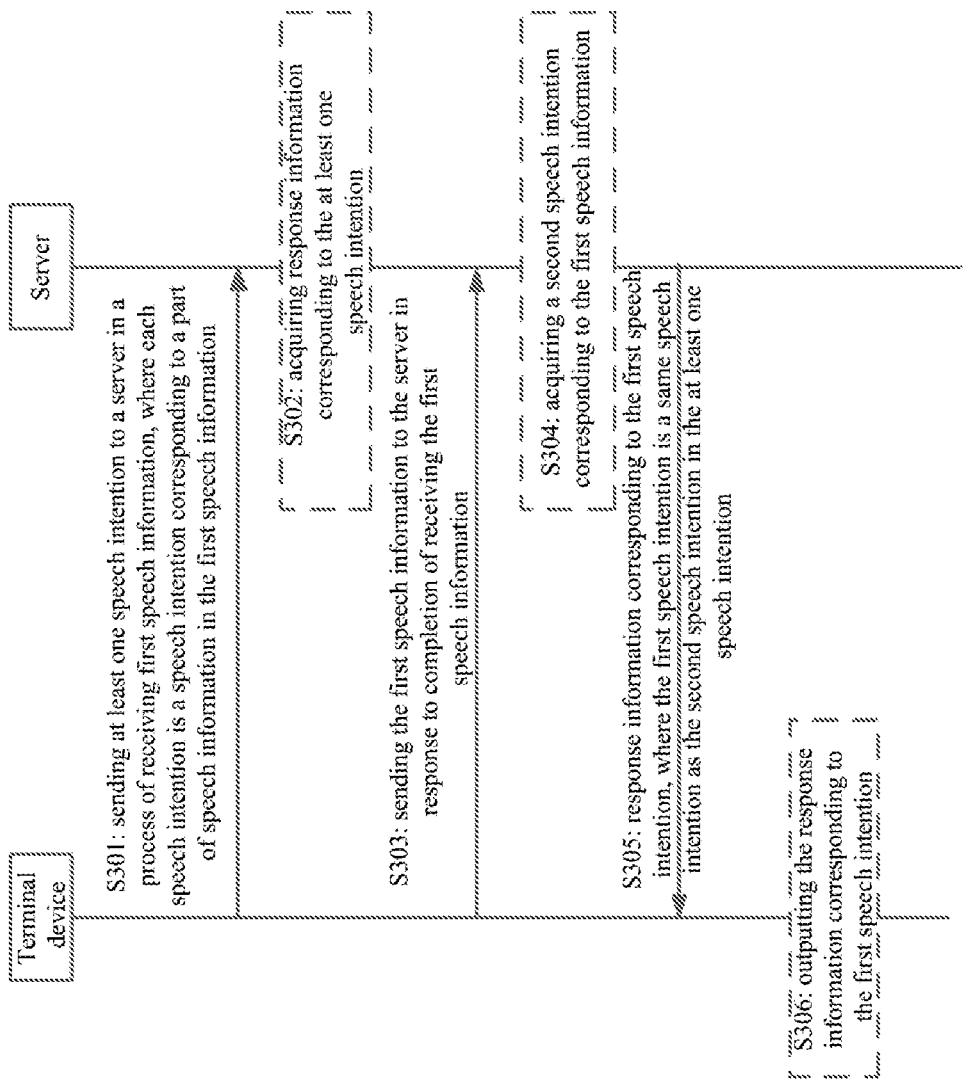
FIG. 3 is an interactive flow diagram of a speech processing method according to an embodiment of the present disclosure.

FIG. 3 is an interactive flow diagram of a speech processing method according to an embodiment of the present disclosure. The method of this embodiment is executed interactively by a terminal device and a server. As shown in FIG. 3, the method of this embodiment includes:

S301: in a process of receiving first speech information, a terminal device sends at least one speech intention to a server, where each speech intention is a speech intention corresponding to a part of speech information in the first speech information.

S302: the server acquires response information corresponding to the at least one speech intention.

The first speech information is speech information input by a user to the terminal device. For example, the first speech information may be "what's the weather like in Shenzhen today (shen zhen jin tian de tian qi zen me yang)" input by the user in FIG. 1. A part of the speech information in the first speech information refers to a certain part of syllable in the first speech information, such as "Shenzhen (shen zhen)", "Shenzhen today (shen zhen jin tian)", "the weather in Shenzhen today (shen zhen jin tian de tian qi)"

and the like. The response information refers to a content that the terminal device needs to output to the user. For example, the response information may be "Shenzhen is sunny today, and the temperature is 10-20 degrees" output by the terminal device in FIG. 1.

In this embodiment, in the process of receiving the first speech information input by the user, the terminal device performs intention prediction on the part of the currently received speech information to obtain at least one speech intention. Each speech intention is a speech intention corresponding to a part of speech information in the first speech information. When the number of speech intentions sent by the terminal device to the server is multiple, the multiple speech intentions may be speech intentions corresponding to different parts of the speech information in the first speech information.

In a possible implementation, the terminal device may perform real-time intention prediction on a part of the speech information currently received. For example, when the terminal device receives "Shen . . . (shen)" input by the user, it performs intention prediction on "Shen . . . (shen)". When the terminal device receives "Shenzhen (shen zhen)" input by the user, it performs intention prediction on "Shenzhen (shen zhen)". When the terminal device receives the "Shenzhen tod . . . (shen zhen jin)" input by the user, it performs intention prediction on "Shenzhen tod . . . (shen zhen jin)". When the terminal device receives the "Shenzhen today (shen zhen jin tian)" input by the user, it performs intention prediction on "Shenzhen today (shen zhen jin tian)" and so on.

In another possible implementation, the terminal device may perform intention prediction on a part of the speech information currently received every preset time interval according to the preset time interval. It should be understood that, since a speaking speed of the user may vary, the number of a syllable received by the terminal device in different preset time intervals may be the same or different. For example, when the terminal device receives "Shenzhen (shen zhen)" within a first preset time interval, it performs intention prediction on "Shenzhen (shen zhen)". When the terminal device receives "the weather today (jin tian de tian qi)" within a second preset time interval, it performs intention prediction on "the weather in Shenzhen today (shen zhen jin tian de tian qi)".

In a yet another possible implementation, the terminal device may, according to a preset number of a syllable, perform intention prediction on the part of the speech information currently received whenever it detects that the number of newly received syllable is greater than or equal to the preset number of the syllable. For example, assuming that intention prediction is performed once every two newly received syllables, then the terminal device will perform intention prediction on the received part of the speech information when it receives "Shenzhen (shen zhen)" "Shenzhen today (shen zhen jin tian)", "Shenzhen today wea . . . (shen zhen jin tian de tian)", and so on.

It should be understood that, in each of the above implementations, when the terminal device performs intention prediction on the part of the currently received speech information, it may or may not predict the speech intention. For example, when the terminal device performs intention prediction on "Shen . . . (shen)" and "Shenzhen (shen zhen)", it is difficult to predict the speech intention. When the terminal device performs intention prediction on "the weather in Shenzhen today (shen zhen jin tian de tian qi)", it can predict that the speech intention is "query the weather in Shenzhen today".

In an embodiment, when the terminal device predicts the speech intention, it can also predict a score of the speech intention, and the score is used to indicate a probability of accurate speech intention. For example, when the terminal device performs intention prediction for "Shenzhen today (shen zhen j in tian)", the following two speech intentions are predicted "query the weather in Shenzhen today" and "query the traffic in Shenzhen today", where the score of "query the weather in Shenzhen today" is 0.5, the score of "query the traffic in Shenzhen today" is 0.5.

Based on the above intention prediction process of the terminal device, further, in the process of receiving the first speech information, the terminal device may send one speech intention to the server, or may send a plurality of speech intentions to the server. The following describes several possible implementations.

In a possible implementation, the terminal device may perform intention prediction according to the above-mentioned implementations until a speech intention is predicted, and then the prediction intention is sent to the server. After sending a speech intention to the server, stop the subsequent intention prediction process. In this implementation, in the process of receiving the first speech information, the terminal device only sends one speech intention to the server. In this way, in subsequent process, the server only needs to acquire corresponding response information in advance for this speech intention, which will not bring a large processing load to the server.

In the above implementations, the terminal device may perform intention prediction according to the above-mentioned implementations until a speech intention with a higher score (for example, the score is higher than a preset threshold) is predicted, and then the speech intention with higher score is sent to the server. After sending a speech intention to the server, stop the subsequent intention prediction process. In this implementation, in the process of receiving the first speech information, the terminal device only sends one speech intention to the server. In this implementation, in the process of receiving the first speech information, the terminal device only sends one speech intention to the server. In this way, in subsequent process, the server only needs to acquire corresponding response information in advance for this speech intention, which will not bring a large processing load to the server. In addition, since the terminal device sends the speech intention with a higher score to the server, the accuracy of the speech intent is ensured, thereby ensuring the accuracy of the response information acquired by the server in advance in the subsequent process.

In another possible implementation, the terminal device may perform intention prediction according to the above-mentioned implementations, and send the speech intention to the server after predicting the speech intention or the speech intention with higher score (for example, the score is higher than the preset threshold). Then continue the subsequent intention prediction process. That is to say, in the process of receiving the first speech information, the terminal device will send multiple speech intentions to the server successively. Further, the server can separately acquire corresponding response information for each speech intention, that is, acquire all possible required response information in advance, so as to ensure the accuracy and completeness of the response information acquired in advance.

In each of the above implementations, after receiving the speech intention sent by the terminal device, the server may acquire response information corresponding to the speech intention. Further, the response information can also be stored.

When the server acquires the response information corresponding to the speech intention, it can acquire the response information by interacting with a third-party resource server. For example, if the speech intention is "query the weather in Shenzhen today", the server can send a query request to a weather server, and then receive queried weather information from the weather server, take the weather information as response information, and store it.

It should be noted that, in the case where the terminal device sends multiple speech intentions to the server, in S301 of this embodiment, the terminal device sends multiple speech intentions to the server successively. For example, in the process of receiving the first speech information, when the terminal device predicts speech intention 1, it sends speech intention 1 to the server; in the subsequent process, when the terminal device predicts speech intention 2, it sends speech intention 2 to the server. Correspondingly, the server successively receives multiple speech intentions from the terminal device, and each time a speech intention is received, it acquires the response information corresponding to the speech intention.

In this way, each time the terminal device predicts a speech intention, it sends the speech intention to the server in time, so that the server can acquire the response information corresponding to the speech intention in time, so as to guarantee speech interaction delay can be reduced.

S303: the terminal device sends the first speech information to the server in response to completion of receiving the first speech information.

That is to say, after receiving the complete first speech information, the terminal device sends the complete first speech information to the server.

It should be understood that the first speech information received by the terminal device is in a form of audio, and the terminal device may directly send the first speech information in the form of audio to the server. Alternatively, the terminal device may use a speech recognition technology to perform speech recognition on the first speech information and convert it into a text form, and then send the first speech information in text form to the server.

S304: the server acquires a second speech intention corresponding to the first speech information.

After receiving the complete first speech information from the terminal device, the server performs intention recognition processing on the first speech information to obtain the second speech intention. Since the server performs intention recognition processing on the complete first speech information, the recognized second speech intention can reflect a real intention of the user.

In a possible implementation, an intent recognition model is deployed in the server. The intention recognition model has an ability of semantic analysis. After receiving the complete first speech information, the server inputs the first speech information into the intention recognition model, and performs semantic parsing processing by the intention recognition model to obtain the second speech intention.

S305: the server sends the response information corresponding to the first speech intention to the terminal device, where the first speech intention is a same speech intention as the second speech intention in the at least one speech intention.

Specifically, after acquiring the second speech intention corresponding to the first speech information, the server compares the second speech intention with the at least one speech intention sent by the terminal device, and determines the first speech intention from the at least one speech intention, where the first speech intention is the same as the second speech intention. That is, the first speech intention is the speech intention that is accurately predicted in the at least one speech intention. Further, the server sends the response information corresponding to the first speech intention to the terminal device.

In S303 to S305 of this embodiment, after receiving the first speech information, the terminal device sends the first speech information to the server, and the server acquires the second speech intention corresponding to the first speech information. Since the server has acquired the response information corresponding to the at least one speech intention in advance, it only needs to find the first speech intention that is the same as the second speech intention from the at least one speech intention, and directly sends the response information corresponding to the first speech intention to the terminal device. In this way, after the terminal device receives the first speech information, the server no longer needs to interact with the third-party resource server to acquire the response information, thereby reducing the speech interaction delay.

S306: the terminal device outputs the response information corresponding to the first speech intention.

Exemplarily, the terminal device may output the response information in the form of speech, or it may also output the response information in the form of text, and also output the response information in the form of graphics and text, which is not limited in this embodiment.

The speech processing method provided by this embodiment includes: in a process of receiving first speech information, a terminal device sends at least one speech intention to a server, where each speech intention is a speech intention corresponding to a part of speech information in the first speech information; the server acquires response information corresponding to the at least one speech intention; the terminal device sends the first speech information to the server in response to completion of receiving the first speech information; the server acquires a second speech intention corresponding to the first speech information, and sends the response information corresponding to the first speech intention to the terminal device, where the first speech intention is a same speech intention as the second speech intention in the at least one speech intention; and the terminal device outputs the response information. In the above process, in the process of receiving the first speech information, the terminal device can predict at least one speech intention in advance, and enables the server to acquire response information corresponding to each speech intention in advance. In this way, after the terminal device receives the first speech information, the server can return the response information acquired in advance to the terminal device, thereby reducing speech interaction delay.

On the basis of the above embodiments, the following describes in detail the process of the terminal device predicting the speech intention in advance and the server acquiring the response information in advance in combination with specific embodiments.

In this embodiment, in the process of receiving the first speech information, the terminal device will successively receive N partial speech information. The partial speech information received each time refers to the speech information from a first syllable of the first speech information to a currently received syllable. In this way, an (i+1)-th part of the speech information includes an i-th part of speech information. A difference between a speech duration corresponding to the first speech information and a speech duration corresponding to a N-th part of speech information is less than or equal to a first threshold, or a difference between a number of a syllable corresponding to the first speech information and a number of a syllable corresponding to the N-th part of speech information is less than or equal to a second threshold. The above syllable may correspond to a word or character expressed by the user. For example, taking Chinese as an example, each character spoken by the user corresponds to a syllable.

For example, in the process of receiving "what's the weather like in Shenzhen today (shen zhen jin tian de tian qi zen me yang)", the terminal device successively receives: a first part of the speech information "Shen . . . (shen)", a second part of the speech information "Shenzhen (shen zhen)", a third part of the speech information "Shenzhen tod . . . (shen zhen jin)", a fourth part of the speech information "Shenzhen today (shen zhen jin tian)", a fifth part of the speech information "Shenzhen today's . . . (shen zhen jin tian de)", a sixth part of the speech information "Shenzhen today's wea . . . (shen zhen jin tian de tian)", a seventh part of the speech information "the weather in Shenzhen today (shen zhen jin tian de tian qi)", an eighth part of the speech information "what the weather in Shenzhen today . . . (shen zhen jin tian de tian qi zen)", a ninth part of the speech information "what the weather like in Shenzhen today . . . (shen zhen jin tian de tian qi zen me)".

It should be understood that the above examples for each part of the speech information are only examples, and there may be other forms, which are not limited in this embodiment. For example, when the terminal device performs intention prediction according to the preset time interval, each part of the speech information can be: a first part of the speech information "Shenzhen (shen zhen)", a second part of the speech information "the weather in Shenzhen today (shen zhen jin tian de tian qi)", a third part of the speech information "what the weather like in Shenzhen today . . . (shen zhen jin tian de tian qi zen me)". For another example, when the terminal device performs intention prediction according to the preset number of the syllable, each part of the speech information may be: a first part of the speech information "Shenzhen (shen zhen)", a second part of the speech information "Shenzhen today (shen zhen jin tian)", and a third part of the speech information "Shenzhen today's wea . . . (shen zhen jin tian de tian)", a fourth part of the speech information "what the weather like in Shenzhen today . . . (shen zhen jin tian de tian qi zen)".

Figure 4:
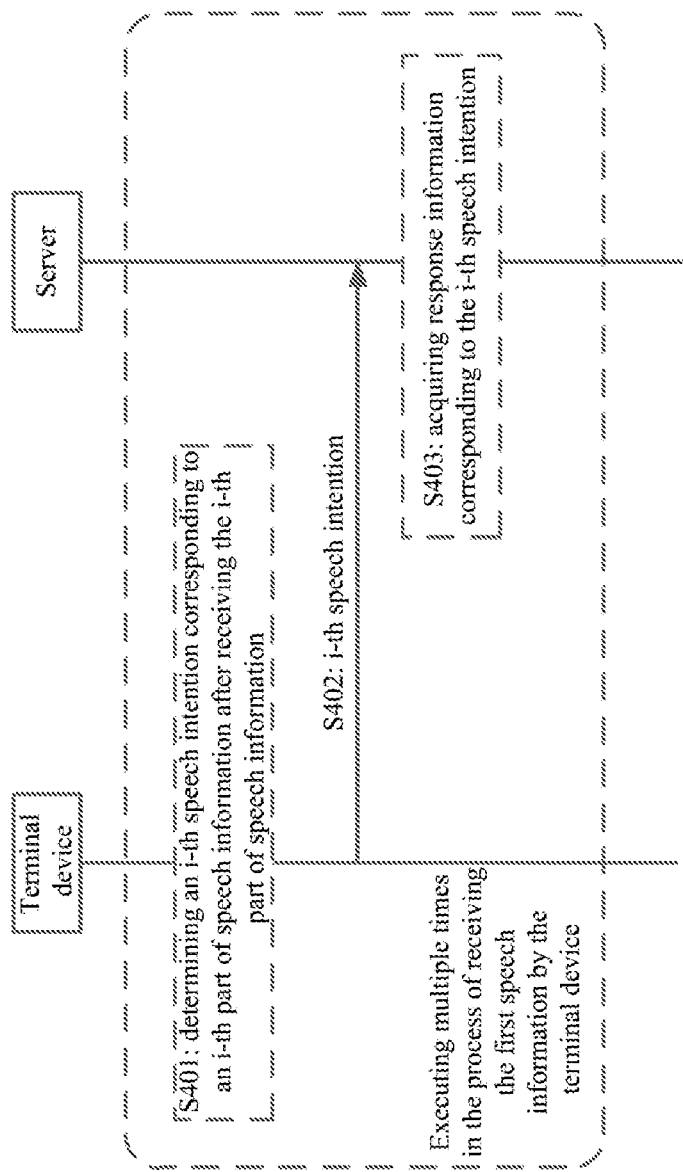
FIG. 4 is an interactive flow diagram of another speech processing method according to an embodiment of the present disclosure.

As a possible implementation, in the process of receiving the first speech information by the terminal device, the method of the embodiment shown in FIG. 4 can be used to predict the speech intention in advance, and acquire the response information in advance.

FIG. 4 is an interactive flow diagram of another speech processing method according to an embodiment of the present disclosure. The method of the present embodiment is executed in the process of receiving the first speech information by the terminal device. In a specific execution process, i takes 1, 2, 3, . . . , N in sequence. As shown in FIG. 4, the method of this embodiment includes:

S401: the terminal device determines an i-th speech intention corresponding to an i-th part of speech information after receiving the i-th part of speech information.

In this embodiment, the terminal device can be deployed with an intention prediction model, the intention prediction model has a function of performing intention prediction on a part of the speech information, and the intention prediction model can be used to predict the intention of the i-th part of the speech information.

In a possible implementation, the i-th part of speech information is input into the intention prediction model to acquire probabilities corresponding to a plurality of prediction intentions output by the intention prediction model; and the i-th speech intention corresponding to the i-th part of speech information is determined according to the probabilities corresponding to the plurality of prediction intentions. By using the intention prediction model to predict the intention of the i-th part of the speech information, the accuracy of predicting the intention can be ensured.

In a possible implementation, a target prediction intention is determined from the plurality of prediction intentions, where the target prediction intention has a highest probability; and the target prediction intention is determined as the i-th speech intention corresponding to the i-th speech information.

In another possible implementation, the prediction intention whose probability is greater than the preset probability among the plurality of prediction intentions is determined as the i-th speech intention corresponding to the i-th part of speech information.

In this embodiment, the intention prediction model may be a machine learning model trained in advance. The intention prediction model is obtained by learning a plurality of groups of training samples, and each group of training samples includes: sample speech information and a sample intention corresponding to the sample speech information; where the sample speech information is a part of the speech information extracted from historical speech information.

Specifically, according to the existing big data technology, the high-frequency intentions of users interacting with terminal devices are counted. Further, historical speech information input by the user for these high-frequency intentions during the speech interaction process is collected. By processing each historical speech information, a group of training samples can be generated.

For example, each group of training samples can be generated by: extracting a part of the speech information from each historical speech information as sample speech information. For example, first K syllable in the historical speech information is used as the sample speech information, or middle M syllable in the historical speech information is used as the sample speech information, etc., where M and K are both integers. Furthermore, the intention of the historical speech information is manually labeled to obtain the sample intention. In this way, a group of training samples is generated according to the above sample speech information and sample intention.

After generating the plurality of groups of training samples, using machine learning algorithms to train the plurality of groups of training samples, and then the intention prediction model can be obtained. It should be noted that this embodiment does not limit the structure and training process of the intention prediction model.

S402: the terminal device sends the i-th speech intention to the server.

In a possible implementation, when i is an integer greater than 1, after determining an i-th speech intention, the terminal device can first determine whether the i-th speech intention is the same as previous i−1 speech intention, and sends the i-th speech intention to the server if the i-th speech intention is different from the previous i−1 speech intention, otherwise, does not send the i-th speech intention to the server. In this way, the server is prevented from receiving a repeated speech intention.

S403: the server acquires response information corresponding to the i-th speech intention.

In this embodiment, the server may be communicatively connected with a plurality of resource servers, and each resource server is configured to store response information corresponding to a speech intention. For example, the plurality of resource servers may include: a weather information server, a traffic information server, a violation information server, etc. The server can acquire the response information by interacting with any of the above resource servers.

In a possible implementation, the server can acquire the response information corresponding to the i-th speech intention in the following way: the server determines a target resource server according to the i-th speech intention, where the target resource server is configured to store the response information corresponding to the i-th speech intention; send a request message to the target resource server, where the request message includes the i-th speech intention; and receive the response information from the target resource server.

In a possible implementation, after acquiring the response information corresponding to the at least one speech intention, the server can also store each speech intention and respective response information corresponding to the speech intention in a cache. In this way, after receiving the complete first speech information, the terminal device sends the first speech information to the server. The server acquires a second speech intention corresponding to the first speech information, and determines, according to the second speech intention, the first speech intention from the at least one speech intention stored in the cache, where the first speech intention is the same as the second speech intention. Further, the server acquires the response information corresponding to the first speech intention from the cache, and sends the response information to the terminal device.

On the basis of any of the above embodiments, the speech processing process of the present disclosure is illustrated below in combination with specific examples.

Figure 5:
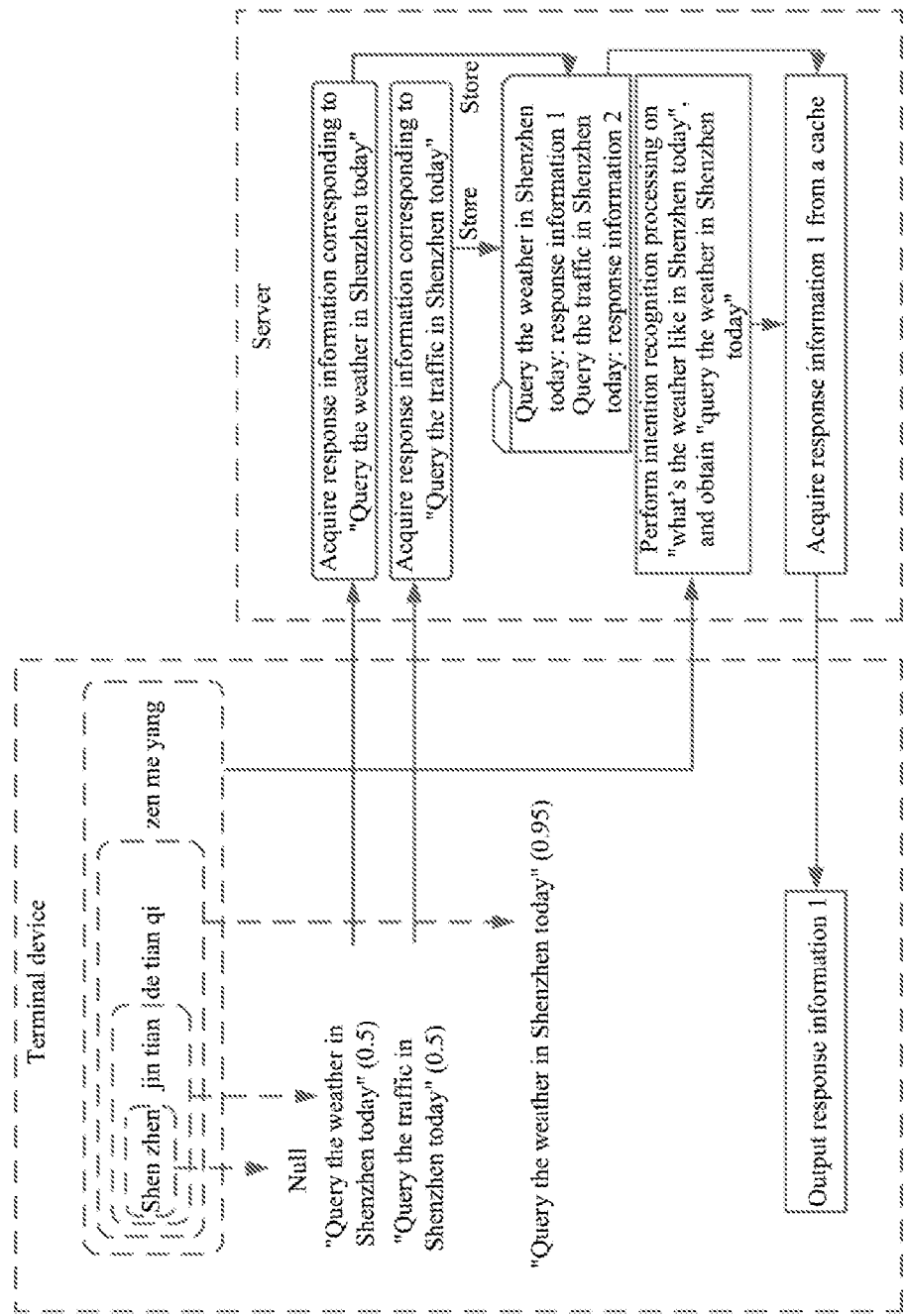
FIG. 5 is a schematic diagram of a speech processing process according to an embodiment of the present disclosure.

FIG. 5 is a schematic diagram of a speech processing process according to an embodiment of the present disclosure. FIG. 5 takes the user inputting the first speech information "what's the weather like in Shenzhen today (shen zhen jin tian de tian qi zen me yang)" as an example. As shown in FIG. 5, when the terminal device receives "Shenzhen (shen zhen)", the terminal device uses the intention prediction model to predict the intention of the currently received "Shenzhen (shen zhen)". Due to the lack of currently received information, the speech intention cannot be predicted, in other words, the probability of each predicted intention output by the intention prediction model is low. Therefore, the terminal device does not send a speech intention to the server.

Continue referring to FIG. 5, when the terminal device receives "Shenzhen today (shen zhen jin tian)", the terminal device uses the intention prediction model to perform intention prediction on the currently received "Shenzhen today (shen zhen jin tian)", and the intention prediction model predicts to obtain two speech intentions, respectively "query the weather in Shenzhen today" and "query the traffic in Shenzhen today", both of these two speech intentions have a score of 0.5. In this case, the terminal device may send both of the above two speech intentions to the server.

Continue referring to FIG. 5, the server acquires corresponding response information for the above two speech intentions, and stores each speech intention and response information corresponding to the speech intention in the cache.

Continue referring to FIG. 5, when the terminal device receives "the weather in Shenzhen today (shen zhen jin tian de tian qi)", the terminal device uses the intention prediction model to perform intention prediction on the currently received "the weather in Shenzhen today (shen zhen jin tian de tian qi)", and obtains that the speech intention is "query the weather in Shenzhen today". Since the speech intention has already been sent to the server, there is no need to send it again.

Continue referring to FIG. 5, when the terminal device receives the complete first speech information "what's the weather like in Shenzhen today", the terminal device sends the complete first speech information to the server. The server performs speech recognition processing on the first speech information, and obtains that the second speech intention is "query the weather in Shenzhen today". Therefore, the server acquires the response information corresponding to "query the weather in Shenzhen today" from the cache, and sends the response information to the terminal device.

Figure 6:
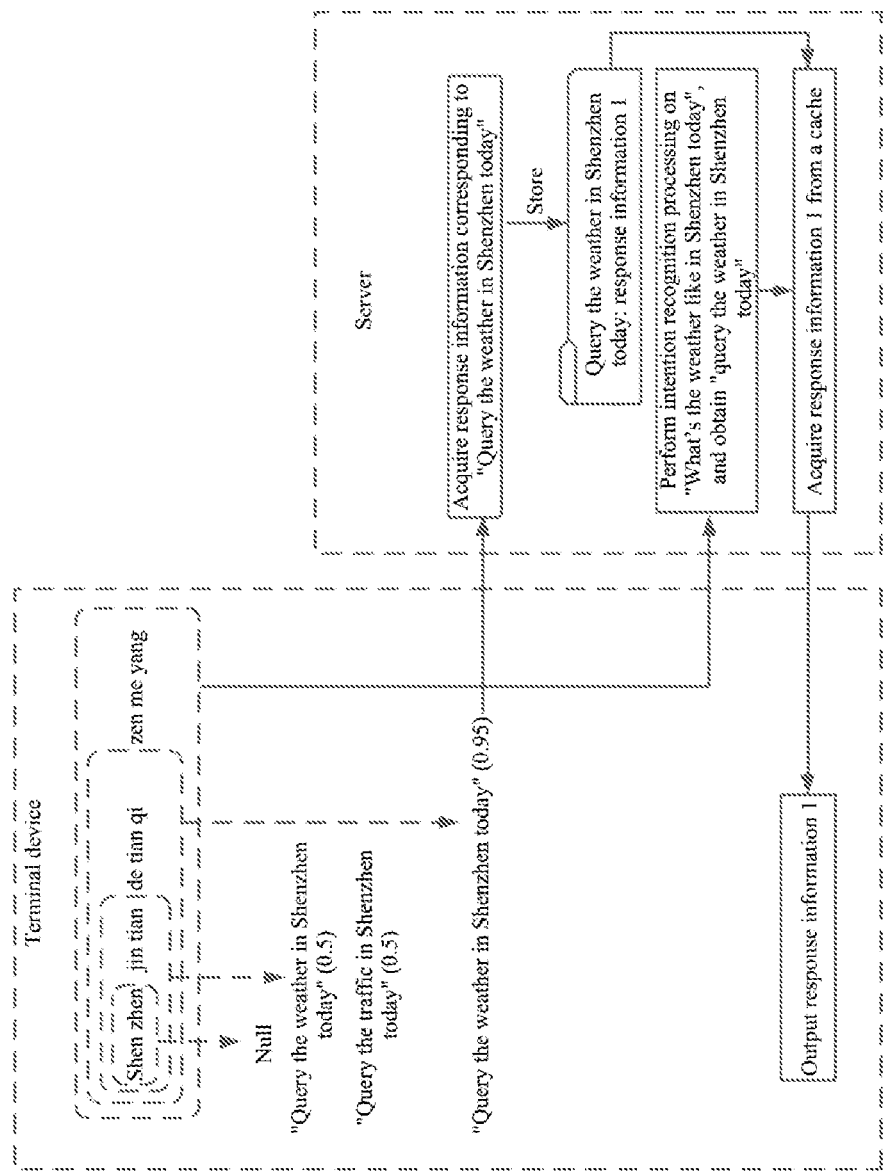
FIG. 6 is a schematic diagram of another speech processing process according to an embodiment of the present disclosure.

FIG. 6 is a schematic diagram of another speech processing process according to an embodiment of the present disclosure. FIG. 6 takes the user inputting the first speech information "what's the weather like in Shenzhen today (shen zhen jin tian de tian qi zen me yang)" as an example. As shown in FIG. 6, when the terminal device receives "Shenzhen (shen zhen)", the terminal device uses the intention prediction model to predict the intention of the currently received "Shenzhen (shen zhen)". Due to the lack of currently received information, the speech intention cannot be predicted, in other words, the probability of each predicted intention output by the intention prediction model is low. Therefore, the terminal device does not send a speech intention to the server.

Continue referring to FIG. 6, when the terminal device receives "Shenzhen today (shen zhen jin tian)", the terminal device uses the intention prediction model to perform intention prediction on the currently received "Shenzhen today . . . (shen zhen jin tian)", and the intention prediction model predicts to obtain two speech intentions, respectively "query the weather in Shenzhen today" and "query the traffic in Shenzhen today", both of these two speech intentions have a score of 0.5. In this case, the terminal device cannot recognize that which speech intention is more accurately, so it does not send the speech intention to the server.

Continue referring to FIG. 6, when the terminal device receives "the weather in Shenzhen today (shen zhen jin tian de tian qi)", the terminal device uses the intention prediction model to perform intention prediction on the currently received "the weather in Shenzhen today (Shenzhen jin tian de tian qi)", and obtains that the speech intention is "query the weather in Shenzhen today", and the score of the speech intention is 0.95. The terminal device sends the speech intention to the server.

Continue referring to FIG. 6, the server acquires corresponding response information for the speech intention, and stores the speech intention and response information corresponding to the speech intention in the cache.

Continue referring to FIG. 6, when the terminal device receives the complete first speech information "what's the weather like in Shenzhen today", the terminal device sends the complete first speech information to the server. The server performs speech recognition processing on the first speech information, and obtains that the second speech intention is "query the weather in Shenzhen today". Therefore, the server acquires the response information corresponding to "query the weather in Shenzhen today" from the cache, and sends the response information to the terminal device.

Figure 7:
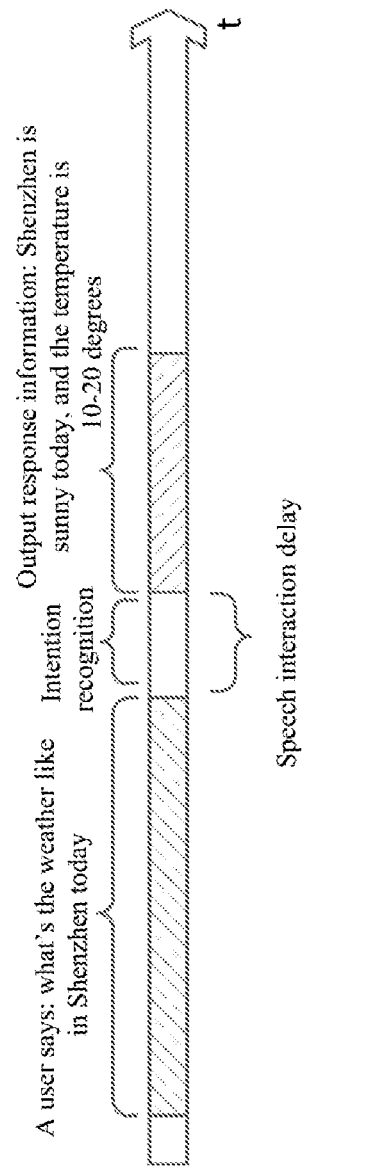
FIG. 7 is a schematic diagram of speech interaction delay in an embodiment of the present disclosure.

FIG. 7 is a schematic diagram of speech interaction delay in an embodiment of the present disclosure. In combination with the examples shown in FIG. 5 and FIG. 6, when the first speech information has not been received completely, the terminal device first performs intention prediction on the currently received part of the speech information, and sends the predicted speech intention to the server, so that the server extracts the response information corresponding to the speech intention, and stores it in the cache. In this way, as shown in FIG. 7, when the terminal device receives the complete first speech information, it only needs to perform intention recognition processing on the complete first speech information, and directly acquire the corresponding response information from the cache according to the recognized intention, and no longer need to interact with the third-party resource server to acquire the response information, thereby reducing speech interaction delay.

Figure 8:
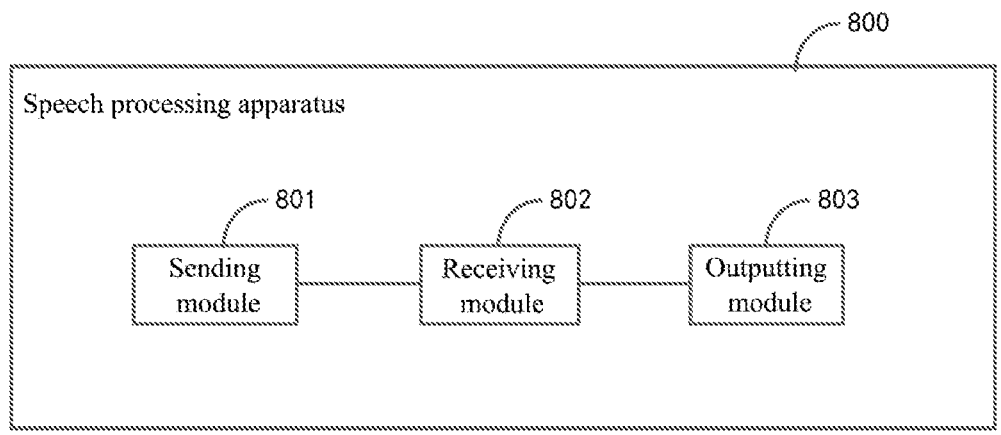
FIG. 8 is a structural diagram of a speech processing apparatus according to an embodiment of the present disclosure.

FIG. 8 is a structural diagram of a speech processing apparatus according to an embodiment of the present disclosure. The apparatus may be in the form of software and/or hardware. As shown in FIG. 8, the speech processing apparatus 800 provided by the present embodiment includes a sending module 801, a receiving module 802 and an outputting module 803.

The sending module 801 is configured to send at least one speech intention to a server in a process of receiving first speech information, where each speech intention is a speech intention corresponding to a part of speech information in the first speech information.

The sending module 801 is further configured to send the first speech information to the server in response to completion of receiving the first speech information.

The receiving module 802 is configured to receive response information corresponding to a first speech intention from the server, where the response information is determined by the server after receiving the first speech intention, the first speech intention is the same as a second speech intention corresponding to the first speech information, and the at least one speech intention includes the first speech intention.

The outputting module 803 is configured to output the response information.

In a possible implementation, the sending module 801 includes:
a determining unit, configured to determine an i-th speech intention corresponding to an i-th part of speech information after receiving the i-th part of speech information; and
a sending unit, configured to send the i-th speech intention to the server, where i takes 1, 2, ..., N in sequence, an (i+1)-th part of speech information includes the i-th part of speech information, and N is an integer greater than or equal to 1;
where a difference between a speech duration corresponding to the first speech information and a speech duration corresponding to a N-th part of speech information is less than or equal to a first threshold, or a difference between a number of a syllable corresponding to the first speech information and a number of a syllable corresponding to a N-th part of speech information is less than or equal to a second threshold.

In a possible implementation, the determining unit includes:
an inputting sub-unit, configured to input the i-th part of speech information into an intention prediction model to acquire probabilities corresponding to a plurality of prediction intentions output by the intention prediction model; and
an determining sub-unit, configured to determine the i-th speech intention corresponding to the i-th part of speech information according to the probabilities corresponding to the plurality of prediction intentions.

In a possible implementation, the determining sub-unit is specifically configured to:
determine a target prediction intention from the plurality of prediction intentions, where the target prediction intention has a highest probability; and
determine the target prediction intention as the i-th speech intention corresponding to the i-th speech information.

In a possible implementation, the intention prediction model is obtained by learning a plurality of groups of training samples, and each group of training samples includes: sample speech information and a sample intention corresponding to the sample speech information; where the sample speech information is a part of the speech information extracted from historical speech information.

In a possible implementation, when i is an integer greater than 1, the sending unit is specifically configured to:
send the i-th speech intention to the server when the i-th speech intention is different from previous i−1 speech intention.

The speech processing apparatus provided in this embodiment can be configured to execute the speech processing method executed by the terminal device in any of the above method embodiments, and the implementation principles and technical effects therebetween are similar, which are not repeated here.

Figure 9:
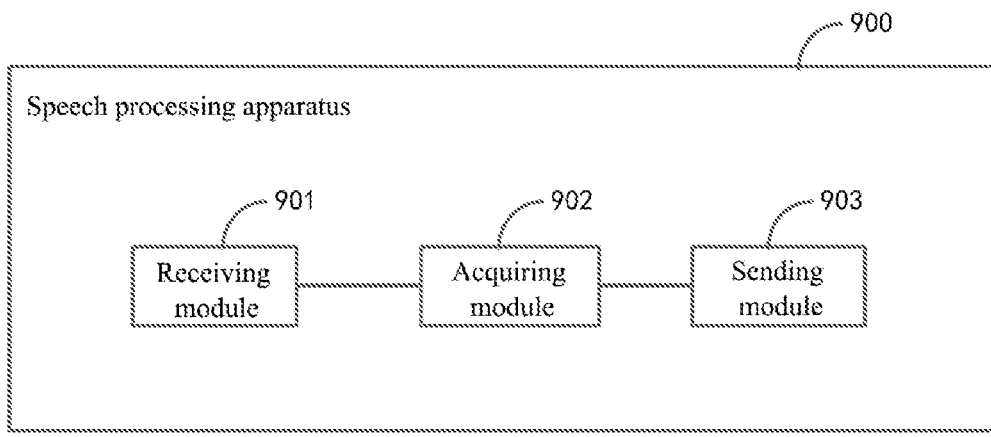
FIG. 9 is a structural diagram of another speech processing apparatus according to an embodiment of the present disclosure.

FIG. 9 is a structural diagram of another speech processing apparatus according to an embodiment of the present disclosure. The apparatus may be in the form of software and/or hardware. As shown in FIG. 9, the speech processing apparatus 900 provided by the present embodiment includes a receiving module 901, an acquiring module 902 and a sending module 903.

The receiving module 901 is configured to receive at least one speech intention sent by a terminal device in a process of receiving first speech information.

The acquiring module 902 is configured to acquire response information corresponding to the at least one speech intention, where each speech intention is a speech intention corresponding to a part of speech information in the first speech information.

The receiving module 901 is further configured to receive the first speech information sent by the terminal device.

The acquiring module 902 is further configured to acquire a second speech intention corresponding to the first speech information.

The sending module 903 is configured to send response information corresponding to the first speech intention to the terminal device, where the first speech intention is a same speech intention as the second speech intention in the at least one speech intention.

In a possible implementation, the receiving module 901 is specifically configured to: receive an i-th speech intention sent by the terminal device.

The acquiring module 902 is specifically configured to: acquire response information corresponding to the i-th speech intention; where the i-th speech intention is determined by the terminal device after receiving an i-th part of speech information, and an (i+1)-th part of speech information includes the i-th part of speech information, i takes 1, 2, . . . , N in sequence, and N is an integer greater than or equal to 1.

A difference between a speech duration corresponding to the first speech information and a speech duration corresponding to a N-th part of speech information is less than or equal to a first threshold, or a difference between a number of a syllable corresponding to the first speech information and a number of a syllable corresponding to a N-th part of speech information is less than or equal to a second threshold.

In a possible implementation, the acquiring module 902 includes:
- a first determining unit, configured to determine a target resource server according to the i-th speech intention, where the target resource server is configured to store the response information corresponding to the i-th speech intention;
- a sending unit, configured to send a request message to the target resource server, where the request message includes the i-th speech intention; and
- a receiving unit, configured to receive the response information from the target resource server.

In a possible implementation, the apparatus further includes: a storing module (not shown in the accompanying figure);

The storing module is configured to store each speech intention and respective response information corresponding to the speech intention in a cache.

The sending module 903 includes:
- a second determining unit, configured to determine, according to the second speech intention, the first speech intention from the at least one speech intention stored in the cache;
- an acquiring unit, configured to acquire the response information corresponding to the first speech intention from the cache; and
- a sending unit, configured to send the response information corresponding to the first speech intention to the terminal device.

The speech processing apparatus provided in this embodiment can be used to execute the speech processing method executed by the server in any of the above method embodiments, and the implementation principles and technical effects therebetween are similar, which are not repeated here.

In the technical solution of the present disclosure, the acquisition, storage and application of the user's personal information involved are all in accordance with the provisions of relevant laws and regulations, and do not violate public order and good customs.

According to an embodiment of the present disclosure, the present disclosure further provides an electronic device, a readable storage medium and a computer program product. The electronic device can be a terminal device or a server.

According to an embodiment of the present disclosure, the present disclosure further provides a computer program product, the computer program product includes: a computer program, which is stored in a readable storage medium, at least one processor of an electronic device can read the computer program from the readable storage medium, and the at least one processor executes the computer program to enable the electronic device to execute the solution provided in any of the above embodiments.

Figure 10:
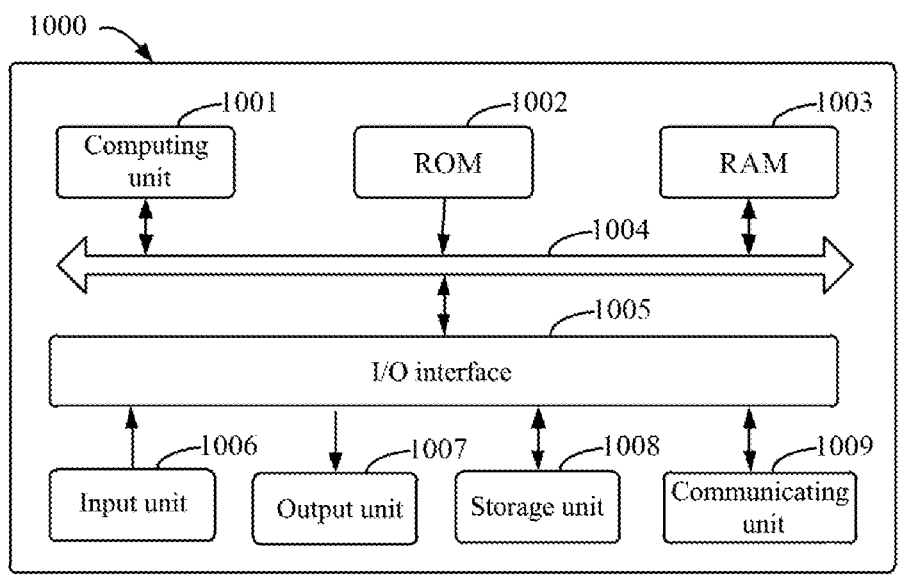
FIG. 10 is a structural diagram of an electronic device according to an embodiment of the present disclosure.

FIG. 10 shows a schematic block diagram of an example electronic device 1000 that can be used to implement an embodiment of the present application. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components shown herein, connections and relationships thereof, as well as functions thereof are merely examples and are not intended to limit implementations of the present application described and/or claimed herein.

As shown in FIG. 10, the electronic device 1000 includes a computing unit 1001 that may execute various appropriate actions and arrangements according to a computer program stored in read-only memory (ROM) 1002 or a computer program loaded into random access memory (RAM) 1003 from the storage unit 1008. In the RAM 1003, various programs and data needed for the operation of the device 1000 can also be stored. The computing unit 1001, ROM 1002 and RAM 1003 are connected to each other through a bus 1004. An input/output (I/O) interface 1005 is also connected to the bus 1004.

A plurality of components in the device 1000 are connected to the I/O interface 1005, including: an input unit 1006, such as a keyboard, a mouse, etc.; an output unit 1007, such as various types of displays, loudspeakers, and the like; a storage unit 1008, such as a magnetic disk, an optical disk, etc.; and a communicating unit 1009, such as a network card, a modem, a wireless communication transceiver, and the like. The communicating unit 1009 allows the device 1000 to exchange information/data with other devices through a computer network such as Internet and/or various telecommunication networks.

The computing unit 1001 may be a variety of general and/or special processing components with processing and computing capabilities. Some examples of the computing unit 1001 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 1001 executes various methods and processes described above, such as the speech processing method executed by the terminal device and the speech processing method executed by the server. For example, in some embodiments, the speech processing method may be implemented as a computer software program that is tangibly contained in a machine-readable medium, such as a storage unit 1008. In some embodiments, some or all of the computer programs may be loaded and/or installed on device 1000 via ROM 1002 and/or communicating unit 1009. When the computer program is loaded into the RAM 1003 and executed by the computing unit 1001, one or more steps of the speech processing method described above may be executed. Alternatively, in other embodiments, the computing unit 1001 may be configured to execute the speech processing method by any other appropriate means (e.g., by means of firmware).

Various implementations of the systems and technologies described above herein can be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. These various embodiments may include: being implemented in one or more computer programs, the one or more computer programs may be executed and/or interpreted on a programmable system including at least one programmable processor, the programmable processor may be a dedicated or general programmable processor, and can receive data and instructions from a storage system, at least one input apparatus, and at least one output apparatus, and transmitting the data and instructions to the storage system, the at least one input apparatus, and the at least one output apparatus.

Program codes for implementing the method of the present disclosure may be written in any combination of one or more programming languages. These program codes may be provided to a processor or controller of a general computer, a dedicated computer, or other programmable data processing apparatus, so that when the program codes are executed by the processor or controller, the functions/operations specified in the flowchart and/or block diagram are implemented. The program codes can be executed entirely on a machine, partly executed on the machine, partly executed on the machine and partly executed on a remote machine as an independent software package, or entirely on the remote machine or server.

In the context of the present disclosure, a machine-readable medium may be a tangible medium that may contain or store programs for use by or in combination with an instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, apparatuses, or devices, or any suitable combination of the foregoing. More specific examples of machine-readable storage media may include one or more line based electrical connection, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

In order to provide interaction with a user, the systems and technologies described herein may be implemented on a computer, where the computer has: a display apparatus (e.g., a CRT (cathode ray tube) or LCD (liquid crystal display) monitor) for displaying information to the user; and a keyboard and a pointing apparatus (e.g., a mouse or a trackball), through which the user can provide inputs to the computer. Other types of apparatuses may also be used to provide interaction with the user; for example, the feedback provided to the user may be any form of sensing feedback (for example, visual feedback, auditory feedback, or tactile feedback); and the input from the user may be received in any form (including acoustic input, speech input, tactile input).

The systems and technologies described here may be implemented in a computing system (e.g., a data server) including a back-end component, or in a computing system (e.g., an application server) including a middleware component, or in a computing system (e.g., a user computer having a graphical user interface or a web browser, through which the user can interact with the implementations of the systems and technologies described herein) including a front-end component, or in a computing system including any combination of the back-end component, the middleware component, or the front-end component. The components of the system may be interconnected via digital data communication (e.g., a communication network) in any form or medium. Examples of the communication network include: a local area network (LAN), a wide area network (WAN) and Internet.

A computer system may include a client and a server. The client and the server are generally located far away from each other and usually interact with each other through a communication network. A relationship between the client and the server is generated by computer programs running on corresponding computers and having a client-server relationship between each other. The server can be a cloud server, also known as a cloud computing server or a cloud host. It is a host product in a cloud computing service system, which solves shortcomings of traditional physical host and VPS services ("Virtual Private Server", or "VPS") such as difficult management and weak business scalability. The server can also be a distributed system server or a server combined with blockchain.

It should be understood that steps can be reordered, added, or deleted by using the various forms of processes shown above. For example, the steps recited in the present application can be performed in parallel, in sequence or in different orders, as long as expected results of the technical solutions disclosed by the present application can be realized, and there is no limitation herein.

The above specific implementations do not limit the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A speech processing method, comprising:
sending at least one speech intention to a server in a process of receiving first speech information, wherein each speech intention is a speech intention corresponding to a part of speech information in the first speech information;
sending the first speech information to the server in response to completion of receiving the first speech information;
receiving response information corresponding to a first speech intention from the server, wherein the response information is determined by the server after receiving the first speech intention, the first speech intention is the same as a second speech intention corresponding to the first speech information, and the at least one speech intention comprises the first speech intention; and
outputting the response information.

2. The method according to claim 1, wherein the sending the at least one speech intention to the server comprises:
determining an i-th speech intention corresponding to an i-th part of speech information after receiving the i-th part of speech information, and sending the i-th speech intention to the server, wherein i takes 1, 2, . . . , N in sequence, an (i+1)-th part of speech information comprises the i-th part of speech information, and N is an integer greater than or equal to 1;

wherein a difference between a speech duration corresponding to the first speech information and a speech duration corresponding to a N-th part of speech information is less than or equal to a first threshold, or a difference between a number of a syllable corresponding to the first speech information and a number of a syllable corresponding to a N-th part of speech information is less than or equal to a second threshold.

3. The method according to claim 2, wherein the determining the i-th speech intention corresponding to the i-th part of speech information comprises:
inputting the i-th part of speech information into an intention prediction model to acquire probabilities corresponding to a plurality of prediction intentions output by the intention prediction model; and
determining the i-th speech intention corresponding to the i-th part of speech information according to the probabilities corresponding to the plurality of prediction intentions.

4. The method according to claim 3, wherein the determining the i-th speech intention corresponding to the i-th part of speech information according to the probabilities corresponding to the plurality of prediction intentions comprises:
determining a target prediction intention from the plurality of prediction intentions, wherein the target prediction intention has a highest probability; and
determining the target prediction intention as the i-th speech intention corresponding to the i-th speech information.

5. The method according to claim 3, wherein the intention prediction model is obtained by learning a plurality of groups of training samples, and each group of training samples comprises: sample speech information and a sample intention corresponding to the sample speech information; wherein the sample speech information is a part of the speech information extracted from historical speech information.

6. The method according to claim 4, wherein the intention prediction model is obtained by learning a plurality of groups of training samples, and each group of training samples comprises: sample speech information and a sample intention corresponding to the sample speech information; wherein the sample speech information is a part of the speech information extracted from historical speech information.

7. The method according to claim 2, wherein when i is an integer greater than 1, the sending the i-th speech intention to the server comprises:
sending the i-th speech intention to the server when the i-th speech intention is different from a previous i−1 speech intention.

8. The method according to claim 3, wherein when i is an integer greater than 1, the sending the i-th speech intention to the server comprises:
sending the i-th speech intention to the server when the i-th speech intention is different from a previous i−1 speech intention.

9. A speech processing method, comprising:
receiving at least one speech intention sent by a terminal device in a process of receiving first speech information, and acquiring response information corresponding to the at least one speech intention, wherein each speech intention is a speech intention corresponding to a part of speech information in the first speech information;
receiving the first speech information sent by the terminal device and acquiring a second speech intention corresponding to the first speech information; and
sending response information corresponding to the first speech intention to the terminal device, wherein the first speech intention is a same speech intention as the second speech intention in the at least one speech intention.

10. The method according to claim 9, wherein the receiving the at least one speech intention sent by the terminal device in the process of receiving the first speech information, and acquiring the response information corresponding to the at least one speech intention comprises:
receiving an i-th speech intention sent by the terminal device and acquiring response information corresponding to the i-th speech intention; wherein the i-th speech intention is determined by the terminal device after receiving an i-th part of speech information, and an (i+1)-th part of speech information comprises the i-th part of speech information, i takes 1, 2, . . . , N in sequence, and N is an integer greater than or equal to 1;
wherein a difference between a speech duration corresponding to the first speech information and a speech duration corresponding to a N-th part of speech information is less than or equal to a first threshold, or a difference between a number of a syllable corresponding to the first speech information and a number of a syllable corresponding to a N-th part of speech information is less than or equal to a second threshold.

11. The method according to claim 10, wherein the acquiring the response information corresponding to the i-th speech intention comprises:
determining a target resource server according to the i-th speech intention, wherein the target resource server is configured to store the response information corresponding to the i-th speech intention;
sending a request message to the target resource server, wherein the request message comprises the i-th speech intention;
receiving the response information from the target resource server.

12. The method according to claim 9, wherein after the acquiring the response information corresponding to the at least one speech intention, further comprising:
storing each speech intention and respective response information corresponding to the speech intention in a cache;
the sending the response information corresponding to the first speech intention to the terminal device comprises:
determining, according to the second speech intention, the first speech intention from the at least one speech intention stored in the cache;
acquiring the response information corresponding to the first speech intention from the cache; and
sending the response information corresponding to the first speech intention to the terminal device.

13. A speech processing apparatus, comprising:
at least one processor, an interface and a memory communicatively connected with the at least one processor; and
wherein the memory stores instructions executable by the at least one processor, and the instructions are executed by the at least one processor, so that the at least one processor is configured to control the interface to execute steps of:

sending at least one speech intention to a server in a process of receiving first speech information, wherein each speech intention is a speech intention corresponding to a part of speech information in the first speech information;

sending the first speech information to the server in response to completion of receiving the first speech information;

receiving response information corresponding to a first speech intention from the server, wherein the response information is determined by the server after receiving the first speech intention, the first speech intention is the same as a second speech intention corresponding to the first speech information, and the at least one speech intention comprises the first speech intention; and outputting the response information.

14. The apparatus according to claim 13, wherein the at least one processor is further configured to execute a step of:

determining an i-th speech intention corresponding to an i-th part of speech information after receiving the i-th part of speech information; and the at least one processor is further configured to control the interface to execute a step of: sending the i-th speech intention to the server, wherein i takes 1, 2, . . . , N in sequence, an (i+1)-th part of speech information comprises the i-th part of speech information, and N is an integer greater than or equal to 1;

wherein a difference between a speech duration corresponding to the first speech information and a speech duration corresponding to a N-th part of speech information is less than or equal to a first threshold, or a difference between a number of a syllable corresponding to the first speech information and a number of a syllable corresponding to a N-th part of speech information is less than or equal to a second threshold.

15. The apparatus according to claim 14, wherein the at least one processor is further configured to control the interface to execute a step of:

inputting the i-th part of speech information into an intention prediction model to acquire probabilities corresponding to a plurality of prediction intentions output by the intention prediction model; and the at least one processor is further configured to execute a step of: determining the i-th speech intention corresponding to the i-th part of speech information according to the probabilities corresponding to the plurality of prediction intentions.

16. The apparatus according to claim 15, wherein the at least one processor is further configured to execute steps of:

determining a target prediction intention from the plurality of prediction intentions, wherein the target prediction intention has a highest probability; and determining the target prediction intention as the i-th speech intention corresponding to the i-th speech information.

17. The apparatus according to claim 15, wherein the intention prediction model is obtained by learning a plurality of groups of training samples, and each group of training samples comprises: sample speech information and a sample intention corresponding to the sample speech information; wherein the sample speech information is a part of the speech information extracted from historical speech information.

18. The apparatus according to claim 16, wherein the intention prediction model is obtained by learning a plurality of groups of training samples, and each group of training samples comprises: sample speech information and a sample intention corresponding to the sample speech information; wherein the sample speech information is a part of the speech information extracted from historical speech information.

19. The apparatus according to claim 14, wherein when i is an integer greater than 1, the at least one processor is further configured to control the interface to execute a step of:

sending the i-th speech intention to the server when the i-th speech intention is different from previous i−1 speech intention.

20. The apparatus according to claim 15, wherein when i is an integer greater than 1, the at least one processor is further configured to control the interface to execute a step of:

sending the i-th speech intention to the server when the i-th speech intention is different from previous i−1 speech intention.

\* \* \* \* \*